US011301559B2

United States Patent
Park

(10) Patent No.: US 11,301,559 B2
(45) Date of Patent: Apr. 12, 2022

(54) CONTACTLESS USER AUTHENTICATION METHOD

(71) Applicant: MUZLIVE INC., Seoul (KR)

(72) Inventor: Jong Sung Park, Seoul (KR)

(73) Assignee: MUZLIVE INC., Seoul (KR)

( * ) Notice: Subject to any disclaimer, the term of this patent is extended or adjusted under 35 U.S.C. 154(b) by 0 days.

(21) Appl. No.: 17/264,922

(22) PCT Filed: Oct. 24, 2019

(86) PCT No.: PCT/KR2019/014064
§ 371 (c)(1),
(2) Date: Feb. 1, 2021

(87) PCT Pub. No.: WO2020/085814
PCT Pub. Date: Apr. 30, 2020

(65) Prior Publication Data
US 2021/0248225 A1 Aug. 12, 2021

(30) Foreign Application Priority Data
Oct. 26, 2018 (KR) .......................... 10-2018-0129389

(51) Int. Cl.
*G11C 7/00* (2006.01)
*G06F 13/00* (2006.01)
(Continued)

(52) U.S. Cl.
CPC ................ *G06F 21/45* (2013.01); *G06F 3/16* (2013.01); *G06F 21/32* (2013.01); *G10L 25/51* (2013.01)

(58) Field of Classification Search
CPC . G06F 21/45; G06F 3/16; G06F 21/32; G10L 25/51
(Continued)

(56) References Cited

U.S. PATENT DOCUMENTS 11,037,555 B2 * 6/2021 Kothari ................... G10L 15/22
2002/0044606 A1 * 4/2002 Togashi ............. H04N 21/2368
375/240.12
(Continued)

FOREIGN PATENT DOCUMENTS

EP          1 978 756 A1     10/2008
JP         2000-276445 A     10/2000
(Continued)

OTHER PUBLICATIONS

Shanthi Therese S.; Speaker Identification and Authentication System using Energy based Cepstral Data Technique; ACM:2016; pp. 1-6.*
(Continued)

*Primary Examiner* — Monjur Rahim
(74) *Attorney, Agent, or Firm* — Harness, Dickey & Pierce, P.L.C.

(57) ABSTRACT

Disclosed is an authentication apparatus. The authentication apparatus according to an embodiment of the present invention comprises: a storage unit for storing authentication data corresponding to content stored in a management server; a control unit for converting the authentication data into a sound wave signal; and a sound wave output unit for outputting the converted sound wave signal.

3 Claims, 5 Drawing Sheets

(51) Int. Cl.
*G06F 12/14* (2006.01)
*G06F 12/00* (2006.01)
*G06F 21/45* (2013.01)
*G06F 3/16* (2006.01)
*G06F 21/32* (2013.01)
*G10L 25/51* (2013.01)

(58) Field of Classification Search
USPC .................................................. 726/18
See application file for complete search history.

(56) References Cited

U.S. PATENT DOCUMENTS

| | | | | |
|---|---|---|---|---|
| 2004/0133789 | A1* | 7/2004 | Gantman | G07F 19/20 |
| | | | | 713/189 |
| 2004/0242201 | A1* | 12/2004 | Sasakura | H04W 12/126 |
| | | | | 455/411 |
| 2009/0141890 | A1 | 6/2009 | Steenstra et al. | |
| 2010/0106968 | A1* | 4/2010 | Mori | H04L 63/12 |
| | | | | 713/158 |
| 2010/0146115 | A1 | 6/2010 | Bezos | |
| 2010/0245042 | A1* | 9/2010 | Tsubaki | G06F 21/32 |
| | | | | 340/5.82 |
| 2014/0115340 | A1* | 4/2014 | Lee | H04L 9/3271 |
| | | | | 713/182 |
| 2015/0186636 | A1* | 7/2015 | Tharappel | G06F 21/32 |
| | | | | 726/8 |
| 2016/0085305 | A1* | 3/2016 | Spio | G06F 3/167 |
| | | | | 381/74 |
| 2016/0149904 | A1* | 5/2016 | Kim | G06K 9/0061 |
| | | | | 713/186 |
| 2017/0302400 | A1* | 10/2017 | Jeng | H04K 1/04 |
| 2019/0019508 | A1* | 1/2019 | Rochford | G10L 15/22 |
| 2019/0104410 | A1* | 4/2019 | Liu | G08C 23/02 |
| 2020/0312317 | A1* | 10/2020 | Kothari | G06F 1/3203 |

FOREIGN PATENT DOCUMENTS

| | | |
|---|---|---|
| JP | 2006-268141 A | 10/2006 |
| JP | 2006-528391 A | 12/2006 |
| JP | 2014-092885 A | 5/2014 |
| KR | 10-2006-0056334 A | 5/2006 |
| KR | 10-2018-0110279 A | 10/2018 |

OTHER PUBLICATIONS

International Search Report from corresponding PCT Application No. PCT/KR2019/014064, dated Feb. 12, 2020.
Written Opinion of the International Searching Authority from corresponding PCT Application No. PCT/KR2019/014064, dated Feb. 12, 2020.
Office Action (Non-Final) from corresponding Korean Patent Application No. 10-2018-0129389, dated Jan. 10, 2020.
Office Action (Final) from corresponding Korean Patent Application No. 10-2018-0129389, dated Jul. 14, 2020.
Decision of Patent Grant from corresponding Korean Patent Application No. 10-2018-0129389, dated Sep. 10, 2020.
Office Action from corresponding Japanese Patent Application No. 2019-194542, dated Aug. 19, 2021.
Extended European Search Report from corresponding European Patent Application No. 19875083.8, dated Oct. 12, 2021.

\* cited by examiner

500

ABK5814 0001
    510      530

CONTACTLESS USER AUTHENTICATION METHOD

CROSS-REFERENCE TO RELATED APPLICATIONS

This application is a national phase application of PCT Application No. PCT/KR2019/014064, filed on Oct. 24, 2019, which claims benefit of Korean Patent Application 10-2018-0129389, filed on Oct. 26, 2018. The entire disclosure of the applications identified in this paragraph are incorporated herein by reference.

TECHNICAL FIELD

The present invention relates to a non-contact-based user authentication method, and more specifically, to a non-contact based user authentication method in which authentication information stored in an authentication apparatus is transmitted to a user terminal device in a non-contact manner and an authentication procedure is performed.

BACKGROUND ART

Cultural technology narrowly refers to technology required for planning, development, and production of various cultural contents, such as movies, games, and animations, but broadly refers to comprehensive technology that improves the quality of cultural life on the basis of science and technology.

Along with the development of such cultural technology, there is the emergence of a new type of content delivery medium breaking away from the existing method. For example, in the music market, universal serial bus (USB)-type albums or albums connectable to an auxiliary (AUX) terminal of a smartphone have emerged to replace traditional CD-type albums.

Such a new type of album is distributed in a manner that a storage medium storing authentication information is sold. When a user who has purchased a storage medium storing authentication information connects the storage medium to a terminal device, such as a smartphone or a tablet personal computer (PC), and then executes an application corresponding thereto, music content corresponding to the authentication information is downloaded from a server to the terminal device.

However, since smartphones and tablet PCs of today are released onto the market without traditional interfaces, such as an AUX terminal, and the like, the authentication information stored in the storage medium may not be transmitted to the user terminal device with the above described interface.

A method of transmitting authentication information to a user terminal device through a wireless communication network interface, such as Wi-Fi or Bluetooth, may be considered, but in this case, the storage medium in which the authentication information is stored needs to be provided with the wireless communication network module as described above, and it takes a predetermined time to establish a pairing between the user terminal device and the storage medium, which causes user inconvenience.

Accordingly, there is a need for a new type of authentication apparatus and authentication method for a new type of album which are capable of transmitting authentication information stored in a storage medium to a user terminal device in a non-contact manner.

SUMMARY

Technical Problem

The present invention provides a non-contact type user authentication method in which authentication information stored in a storage medium is transmitted to a user terminal device in a non-contact manner to perform a user authentication procedure.

The technical objectives of the present invention are not limited to the above, and other objectives may become apparent to those of ordinary skill in the art on the basis of the following description.

Technical Solution

According to one aspect of the present invention, there is provided an authentication apparatus including: a storage configured to store authentication data corresponding to content stored in a management server; a controller configured to convert the authentication data into a sound wave signal; and a voice outputter configured to output the converted sound wave signal.

The controller may perform control to output a prerequisite signal notifying in advance that authentication information is to be transmitted as a sound wave signal first, and then to output the authentication information converted into the sound wave signal.

The voice outputter may output the prerequisite signal for a preset time of t1, and after a preset time of t2 elapses, output a sound wave signal having a frequency corresponding to "0" or "1" for a preset time of t3.

The controller may output the authentication data with an identification value, which is data randomly generated at each time of receiving an authentication information output comment, added thereto.

The controller may generate a different identification value at each time of generating the identification value rather than generating an identification value identical to a previously generated identification value.

The identification value may include one of a random number that is generated at random, numerical data that is sequentially increased, and data that is generated to correspond to a current time.

According to another aspect of the present invention, there is provided an authentication method performed by a user authentication system including an authentication apparatus, a user terminal device, and a management server, the authentication method including: converting, by the authentication apparatus, previously stored authentication data into a sound wave signal and outputting the converted sound wave signal; converting, by the user terminal having received the sound wave signal, the authentication data into digital data and transmitting the digital data to the management server; comparing, by the management server, previously stored authentication data with the authentication data received from the user terminal device to determine validity of the authentication data; and transmitting, in response to authentication being successful upon determining the validity of the authentication data by the management server, a content file corresponding to the authentication data or an acquisition path of the content file to the user terminal device.

The converting, by the authentication apparatus, of the previously stored authentication data into the sound wave signal and outputting the sound wave signal may include outputting the authentication information with an identification value, which is data randomly generated at each time of receiving an authentication information output command, added thereto.

The comparing, by the management server, of the previously stored authentication data with the authentication data received from the user terminal device to determine the validity of the authentication data may include determining, in response to the identification value added to the authentication data being different from previously stored identification values, the identification value to be a new identification value, and storing the new identification value to match with the authentication data.

The authentication method may further include determining that authentication is successful upon determining that the identification value added to the authentication data is the new identification value.

The comparing, by the management server, of the previously stored authentication data with the authentication data received from the user terminal device to determine the validity of the authentication data may include determining that authentication fails upon determining that the identification value added to the authentication data is identical to the previously stored identification values.

Advantageous Effects

As is apparent from the above, according to the authentication apparatus and authentication method, authentication information can be transmitted in a simple manner even when a separate communication module for connecting the authentication apparatus to a user terminal device in by a wired or wireless manner is not provided.

In addition, authentication information transmitted in the form of a sound wave signal can be prevented from being used without permission due to being exposed.

DETAILED DESCRIPTION

Hereinafter, exemplary embodiments of the present invention will be described in detail with reference to the accompanying drawings. Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims. Like numbers refer to like elements throughout the description of the figures.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Figure 1:
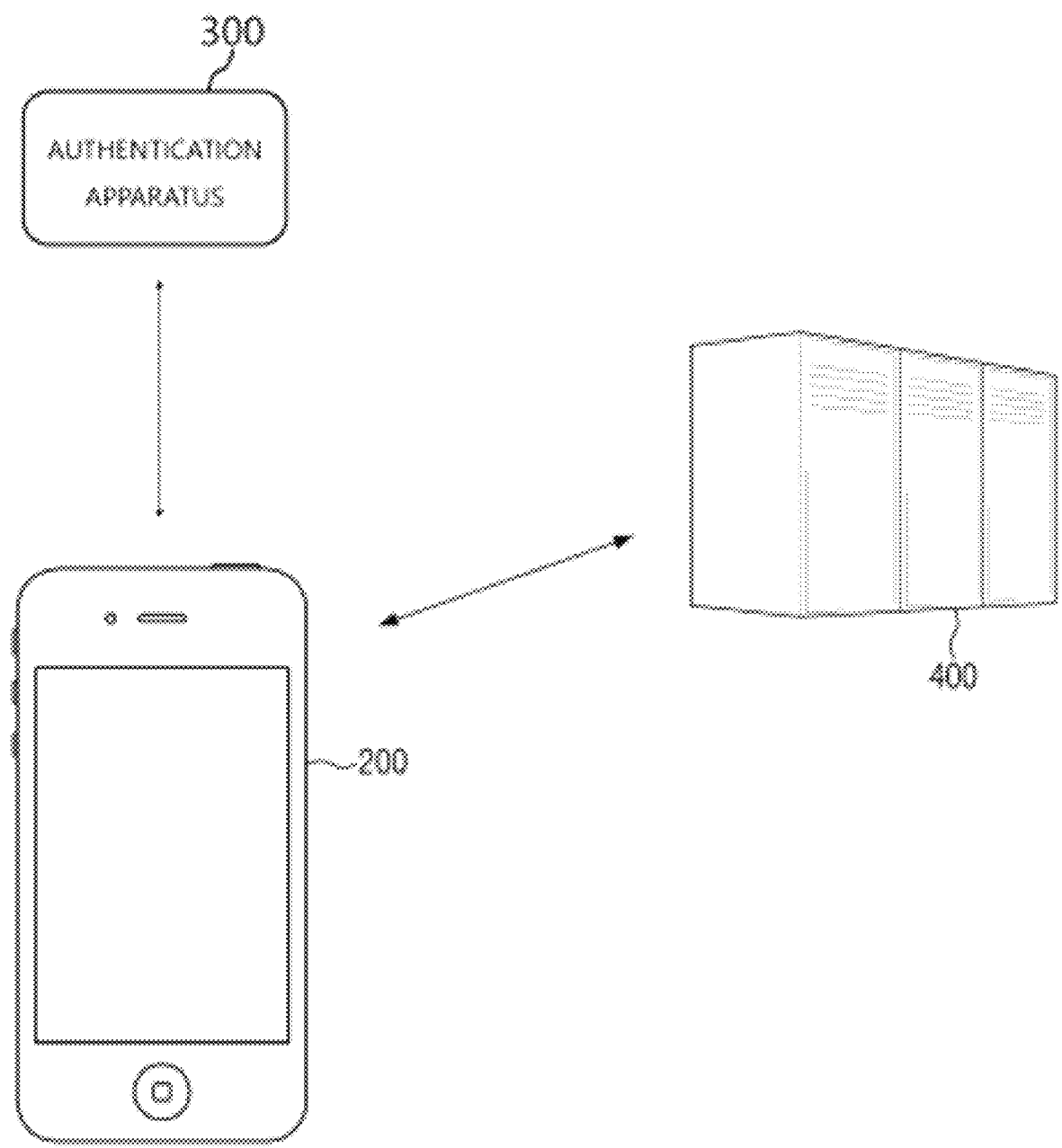
FIG. 1 is a system diagram illustrating an authentication system according to an embodiment of the present invention.

FIG. 1 is a system diagram illustrating an authentication system 100 according to an embodiment of the present invention.

The authentication system 100 according to the embodiment of the present invention includes a user terminal device 200, an authentication apparatus 300, and a management server 400.

The user terminal device 200 may be an electronic device, such as a smartphone or a tablet personal computer (PC) and may have a dedicated application installed thereon to reproduce content received from the management server 400. In addition, the dedicated application may receive authentication information transmitted from the authentication apparatus 300 and transmit the authentication information to the management server 400 such that an authentication procedure is performed.

The authentication apparatus 300 stores authentication data required to download content from the management server 400. In addition, the authentication apparatus 300 may include a voice signal outputter (not shown) that converts the authentication data into a predetermined voice signal and outputs the predetermined voice signal. The voice signal outputter according to the embodiment of the present invention may be implemented as a speaker.

The management server 400 stores a plurality of content files corresponding to authentication data. In the present embodiment, the management server 400 is illustrated as a single physical server, but this is for convenience of description and may be physically or logically divided into a server that performs authentication, a server that stores content files, and the like.

When the management server 400 is physically or logically divided into an authentication server and a content storage server, the management server 400 transmits an acquisition path for downloading content corresponding to authentication data received from the user terminal device 200 to the user terminal device 200.

Upon receiving the acquisition path, the user terminal device 200 may access the content storage server through the acquisition path and download the content corresponding to the authentication data.

Hereinafter, a process of transmitting, by the authentication apparatus 300, authentication information to the user terminal device 200 in a non-contact manner will be described in detail.

Figure 2:
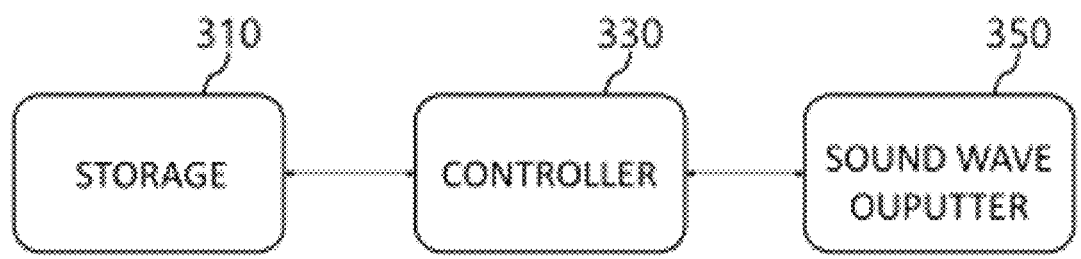
FIG. 2 is a functional block diagram illustrating an authentication apparatus (300) according to the embodiment of the present invention.

FIG. 2 is a functional block diagram illustrating the authentication apparatus 300 according to the embodiment of the present invention.

The authentication apparatus 300 according to the embodiment of the present invention includes a storage 310, a controller 330, and a sound wave outputter 350. Referring to FIG. 2, only components related to the embodiment of the present invention are shown, but it should be understood by those skilled in the art that the authentication apparatus may further include other general-purpose components in addition to the components shown in FIG. 2.

The storage 310 stores authentication data. The authentication data corresponds to a predetermined content file. Accordingly, a user who possesses the authentication apparatus 300 may be allowed to download the content file corresponding to the authentication data through the user terminal device 200.

The controller 330 converts the authentication data stored in the storage 310 into a sound wave signal and outputs the sound wave signal. The controller 330 according to the embodiment of the present invention converts the authentication data, which is digital data expressed as a combination of "0" and "1", into a sound wave signal.

For example, data corresponding to "0" is converted into a sound wave signal having a first frequency, and data corresponding to "1" is converted into a sound wave signal having a second frequency different from the first frequency.

Meanwhile, the controller 330 according to the embodiment of the present invention may first output a prerequisite signal before converting authentication information into a sound wave signal and outputting the sound wave signal. Here, the prerequisite signal is a signal for notifying in advance the user terminal device 200, which will receive the sound wave signal, that authentication information is to be transmitted as a sound wave signal.

In addition, the authentication information refers to data that is authentication data stored in the storage 310 to which an identification value generated by the controller 330 is added. The identification value will be described in detail below.

That is, the prerequisite signal is a signal for notifying in advance the user terminal device 200, which will receive the sound wave signal output from the authentication apparatus 300, that authentication information is to be transmitted as a sound wave signal and output.

Accordingly, upon receiving an authentication information output command from a user, the controller 330 according to the embodiment of the present invention may perform control to output a prerequisite signal first, and after a preset time elapses, output authentication information converted into a sound wave signal.

The sound wave outputter 350 outputs the prerequisite signal and the sound wave signal generated by the controller 330.

Hereinafter, a process of converting authentication information into a sound wave signal will be described in detail.

Figure 3:
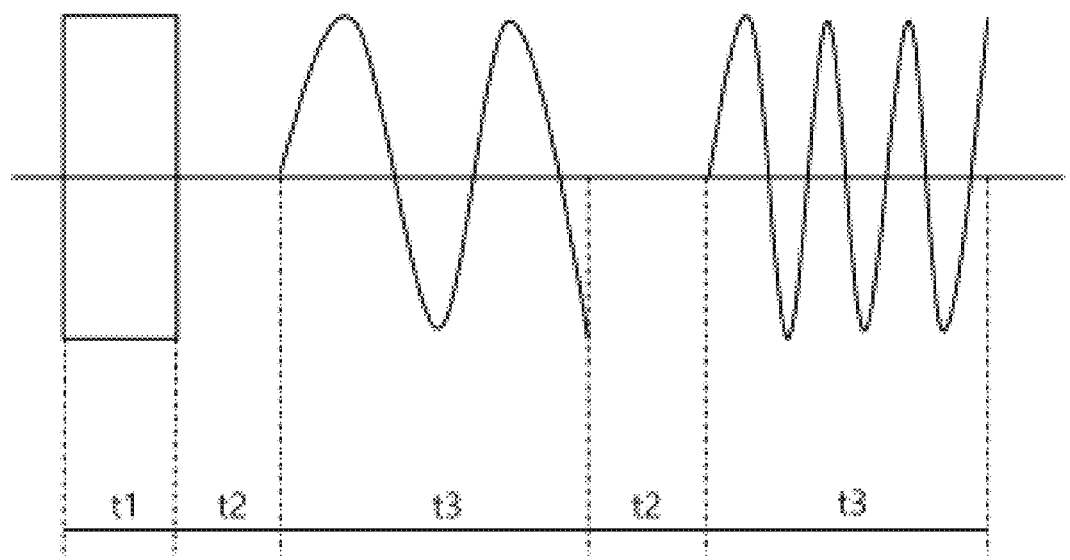
FIG. 3 is a diagram for describing a sound wave signal generated by a controller according to the embodiment of the present invention.

FIG. 3 is a diagram for describing a sound wave signal generated by the controller according to the embodiment of the present invention.

The controller 330 according to the embodiment of the present invention first outputs a prerequisite signal before outputting authentication information converted into a sound wave signal. The prerequisite signal is a signal for allowing the user terminal device 200 receiving a sound wave signal to easily distinguish a time point for analyzing accurate data before analyzing the sound wave signal.

The prerequisite signal according to the embodiment of the present invention may be output for a preset time t1.

When a preset waiting time t2 elapses after the prerequisite signal is output, the controller 330 outputs the authentication information converted into the sound wave signal. The waiting time refers to the time taken to distinguish the prerequisite signal and the authentication, and distinguish "0" and "1", which are binary data included in the authentication information.

In addition, the prerequisite signal is configured to, because the output of the sound wave signal corresponding to "0" or "1" is followed by the output of the next sound wave after a waiting time, facilitate the distinction between the sound wave signals.

The controller 330 outputs a first frequency corresponding to "0" and a second frequency corresponding to "1" in order to convert authentication information, which is binary data, into a sound wave signal.

According to the embodiment of the present invention, the first frequency indicating "0" may be 1000 Hz, and the second frequency indicating "1" may be 2200 Hz. However, the frequencies corresponding to "0" and "1" are illustrative, and it should be understood that sound wave signals of different frequencies may be adopted as long as the first and second frequencies have different values significantly distinguished from each other.

The sound wave signal having the first frequency and the second frequency is output for a preset time t3. When t3 is too short, the error rate may increase in recognizing the frequencies of the corresponding sound wave signal and converting the sound wave signal into digital data, and when t3 is too long, the time required to transmit the sound wave signal may be lengthened. Therefore, preferably, the sound wave signal may be output for a time period of 50 msec to 500 msec.

When authentication information is transmitted as described above, the authentication information may be transmitted in a simple manner without a separate communication module for connecting the authentication apparatus 300 to the user terminal device 200 in a wired or wireless manner.

Figure 4:
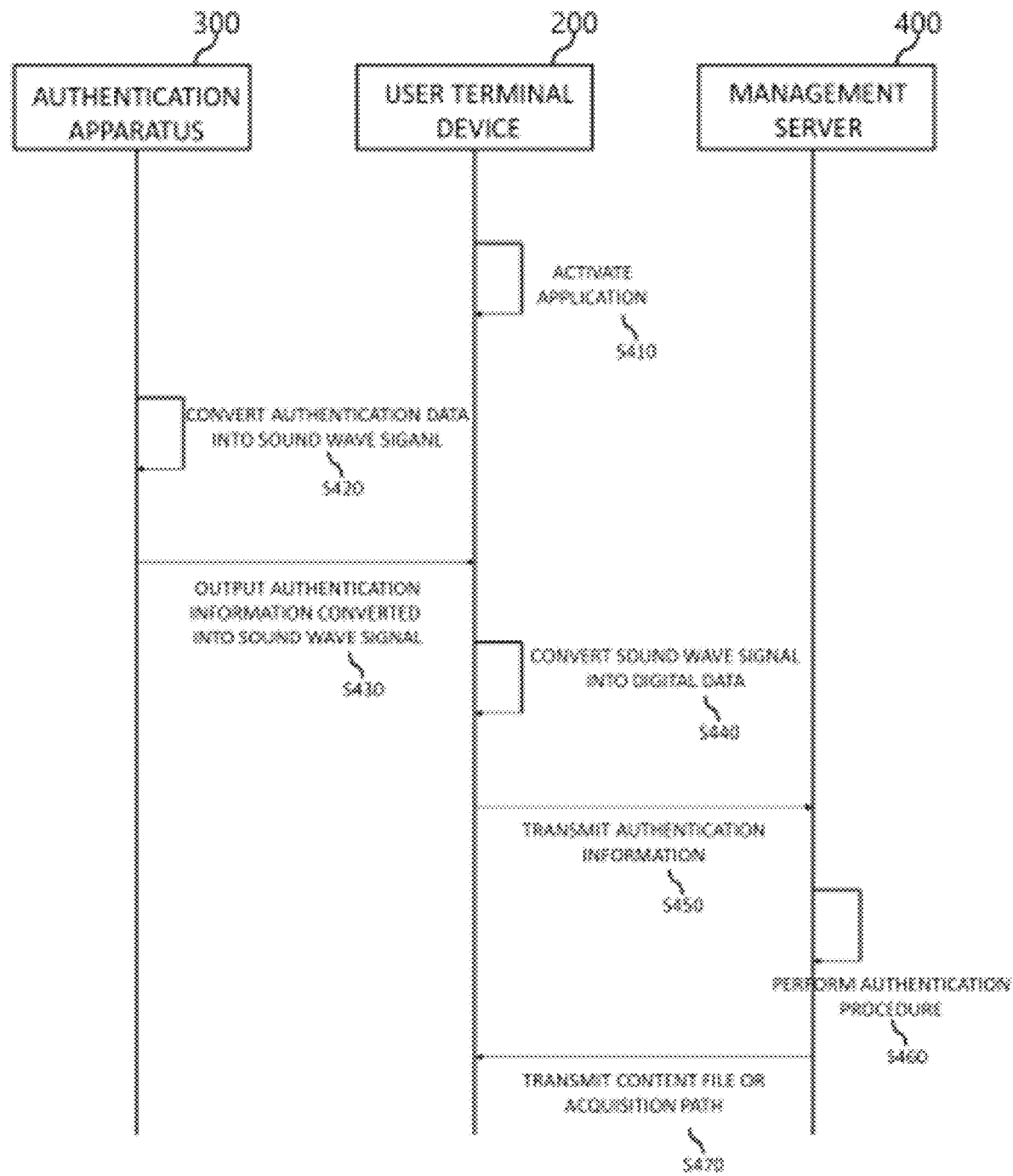
FIG. 4 is a diagram for describing a process of downloading content using authentication information converted into a sound wave signal and output by the authentication apparatus according to the embodiment of the present invention.

FIG. 4 is a diagram for describing a process of downloading content using authentication information converted into a sound wave signal and output by the authentication apparatus according to the embodiment of the present invention.

First, a user activates an application installed on the user terminal device 200 to download content using the authentication apparatus 300 (S410). The application in an activated state operates the microphone of the user terminal device 200 to receive a sound wave signal generated from the outside, and waits for a sound wave signal related to authentication information output from the authentication apparatus 300.

Thereafter, when the user inputs an operation command by pressing a switch and the like provided in the authentication apparatus 300, authentication data, which is digital data stored in the authentication apparatus 300, is converted into a sound wave signal (S420). Since the method of converting authentication data, which is digital data, into a sound wave signal is the same as that described in FIG. 3, redundant description will be omitted.

The sound wave outputter provided in the authentication apparatus 300 outputs authentication information in the form of a sound wave signal generated by the controller (S430). The controller according to the embodiment of the present invention may perform control to repeatedly output the authentication information of the sound wave signal several times. This is because when the authentication information converted into the sound wave signal is converted into digital data, an error may occur due to external noise or the like.

The sound wave signal contains the prerequisite signal and the authentication information. Upon receiving the prerequisite signal, the user terminal device 200 recognizes the prerequisite signal and waits for authentication information to be received.

Upon receiving the authentication information in the form of a sound wave, the user terminal device 200 converts the authentication information in the form of a sound wave into digital data (S440). As described above, the authentication information converted into the sound wave signal may be output several times, and the user terminal device 200 may repeat the conversion operation several times and perform a verification operation on the authentication information converted into digital data The verification operation may be performed by comparing previously converted authentication information with pieces of authentication information generated through repeated conversions. When pieces of authentication information generated through repeated conversion operations are the same, it is determined that the conversion has been completed without an error, and the authentication information is transmitted to the management server 400 (S450).

On the other hand, when the pieces of authentication information generated through several times of conversions are different from each other, a signal for requesting a sound wave signal is generated again such that the user drives the authentication apparatus 300 again and authentication information converted into a sound wave signal is output again.

Upon completion of the verification of the authentication information, the authentication information is transmitted to the management server 400. A mapping table for content corresponding to authentication data included in the authentication information may be stored in the management server 400 in advance.

When the authentication data received from the user terminal device 200 is the same as the authentication data stored in the management server 400 in advance, it may be determined that authentication is successful (S460).

When the authentication is successful, the management server 400 may directly transmit a content file corresponding to the authentication data to the user terminal device 200 or may return an acquisition path for downloading the content file to the user terminal device 200 (S470). Here, the content acquisition path may be Uniform Resource Locator (URL) information through which a content file may be downloaded.

Upon receiving the content acquisition path from the management server 400, the user terminal device 200 may access a corresponding server to download the content.

Meanwhile, when authentication information requiring security is transmitted in the form of a sound wave signal that is likely to be exposed to unspecified individuals, the sound wave signal may be recorded and used for an authentication process, so there is a need for a security measure.

Figures 5, 6:
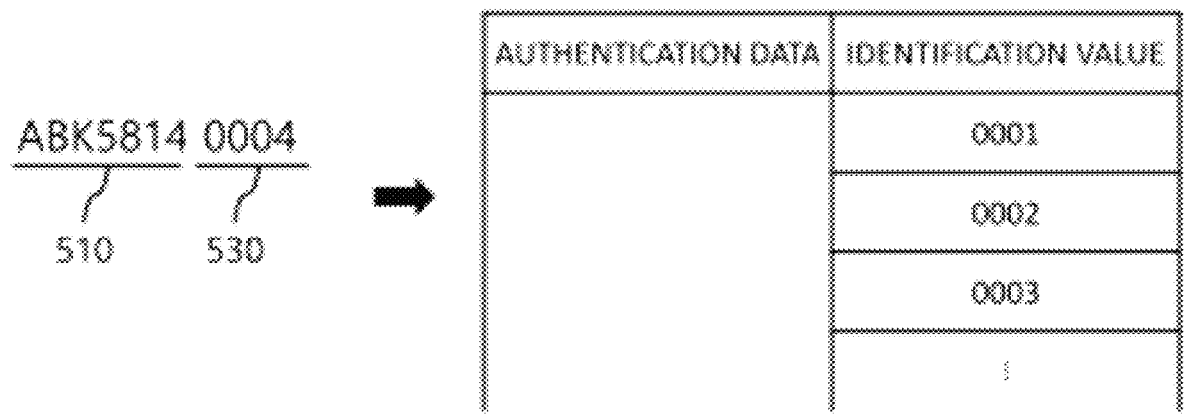
FIG. 5 is a diagram for describing an identification value added to authentication information according to the embodiment of the present invention.
FIG. 6 is a diagram illustrating a method of verifying authentication information using an identification value by a management server according to the embodiment of the present invention.

FIG. 5 is a diagram for describing an identification value added to authentication information according to the embodiment of the present invention.

When outputting authentication information, the controller 330 of the authentication apparatus 300 according to the embodiment of the present invention may add a randomly generated identification value to the authentication data previously stored in the storage 310 and output the authentication data with the identification value added thereto.

An identification value 530 refers to data that is randomly generated whenever an authentication information output comment is received from a user.

The identification value 530 according to the embodiment of the present invention may be a random number that is generated at random or may be numerical data that is sequentially increased. Alternatively, the identification value 530 may be data generated to correspond to the current time.

The identification value 530 generated by the controller 330 is a value generated whenever an authentication information output comment is input from a user. An identification value 530 identical to the previously generated identification value 530 is prevented from being generated, and the identification values 530 generated by the controller 330 are all provided to have different values.

The management server 400 uses the identification value to determine whether the authentication information received from the user terminal device 200 is valid authentication information or authentication information leaked by unauthorized recording.

FIG. 6 is a diagram illustrating a method of verifying authentication information using an identification value by the management server according to the embodiment of the present invention.

The management server 400 according to the embodiment of the present invention stores authentication data 510 to match with identification values having a history of being transmitted in a state of being added to the authentication data 510.

In the embodiment shown in FIG. 6, identification values "0001," "0002," and "0003" stored to match with authentication data "ABK5814" are identification values having a history of being previously transmitted together with authentication data.

The management server 400 compares an identification value 530 newly transmitted in a state of being added to authentication data 510 with the previously stored identification value and determines whether the identification value is an identification value having a history of previous transmission.

When the identification value 530 newly transmitted in a state of being added to the authentication data 510 is different from the previously stored identification values, the management server 500 determines the newly received identification value to be a new identification value having no history of transmission and stores the newly received identification value to match with the authentication data. Otherwise, the management server 400 determines the newly received identification value to be an identification value having a history of previous transmission.

When the identification value transmitted from the user terminal device 200 is a new identification value, the management server 400 determines that the authentication information is valid.

Upon determining that the authentication information is valid, the management server 400 determines that the authentication has been successful and transmits content or a content acquisition path corresponding to the authentication data as described above.

Figure 7:
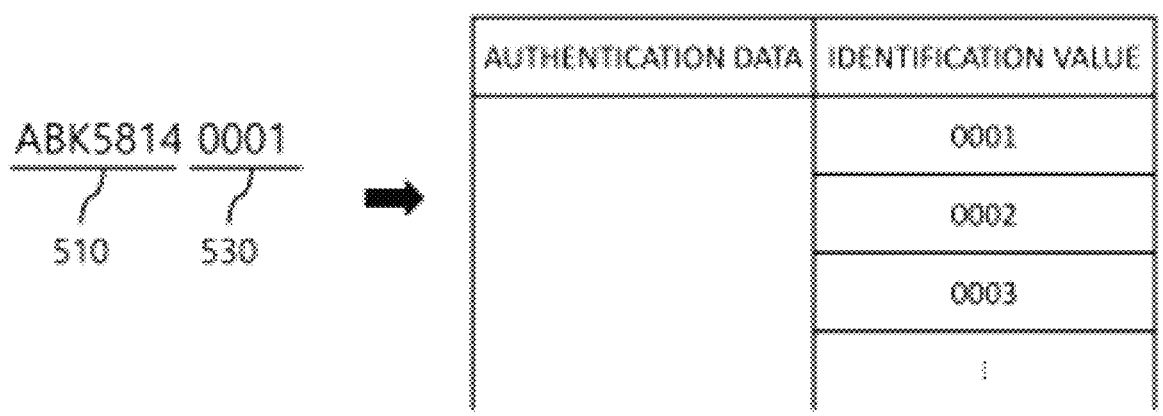
FIG. 7 is a diagram for describing a method of verifying authentication information using an identification value by a management server according to another embodiment of the present invention.

FIG. 7 is a diagram for describing a method of verifying authentication information using an identification value by a management server according to another embodiment of the present invention.

As shown in FIG. 7, the identification value 530 included in the authentication information may be identical to the identification value previously stored in the management server.

As described above, since the identification value is provided to have a different value each time the identification value is generated, the transmission of an identification value having a history of being previously transmitted to the management server 400 means that a sound wave signal output from the authentication apparatus 300 is recorded without permission. Accordingly, the management server 400 according to the embodiment of the present invention may determine that authentication has failed when an identification value identical to a previously stored identification value is received.

As described above, when a one-time use identification value, which is generated to have a different value at each time of the generation, is transmitted together with authentication data, authentication information transmitted in the form of a sound wave signal may be prevented from being used without permission due to being exposed.

Although the present invention has been described in detail above with reference to the exemplary embodiments, those of ordinary skill in the technical field to which the present invention pertains should be able to understand that various modifications and alterations may be made without departing from the technical spirit or essential features of the present invention. Therefore, it should be understood that the disclosed embodiments are not limiting but illustrative in all aspects. The scope of the present invention is defined not by the above description but by the following claims, and it should be understood that all changes or modifications derived from the scope and equivalents of the claims fall within the scope of the present invention.

What is claimed is:

1. An authentication method performed by a user authentication system including an authentication apparatus, a user terminal device, and a management server, the authentication method comprising:
    converting, by the authentication apparatus, authentication information into a sound wave signal wherein the authentication information is generated by adding an identification value which is generated randomly or according to sequentially increased numerical data each time the authentication information output comment is received, to the authentication data and outputting the converted sound wave signal;
    transmitting, by the user terminal having received the sound wave signal, the authentication data into digital data and transmitting the digital data to the management server;
    comparing, by the management server, the previously stored authentication data with the authentication data received from the user terminal device to determine validity of the authentication data; and
    transmitting, in response to authentication being successful upon determining the validity of the authentication data by the management server, a content file corresponding to the authentication data or an acquisition path of the content file to the user terminal device,
    wherein the authentication information includes authentication data stored in a storage to which an identification value is added,
    wherein the authentication data is outputted with a same value each time the authentication information is outputted and the identification value is generated randomly or according to sequentially increased numerical data each time the authentication information output comment is received, and
    wherein the comparing, by the management server, of the previously stored authentication data with the authentication data received from the user terminal device to determine the validity of the authentication data includes determining that authentication fails upon determining that the identification value added to the authentication data is identical to the previously stored identification values.

2. The authentication method of claim 1 wherein the comparing, by the management server, of the previously stored authentication data with the authentication data received from the user terminal device to determine the validity of the authentication data includes determining, in response to the identification value added to the authentication data being different from previously stored identification values, the identification value to be a new identification value and storing the new identification value to match with the authentication data.

3. The authentication method of claim 2, further comprising determining that authentication is successful upon determining that the identification value added to the authentication data is the new identification value.

* * * * *